United States Patent
Kapoor et al.

(10) Patent No.: US 8,818,314 B2
(45) Date of Patent: Aug. 26, 2014

(54) FILTERING INTERFERENCE DETECTED AT WIRELESS RECEIVER

(75) Inventors: Ajay Kapoor, Wijchen (NL); Maurice Stassen, Eindhoven (NL)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/695,473

(22) PCT Filed: May 18, 2011

(86) PCT No.: PCT/EP2011/058082
§ 371 (c)(1),
(2), (4) Date: Oct. 31, 2012

(87) PCT Pub. No.: WO2011/151182
PCT Pub. Date: Dec. 8, 2011

(65) Prior Publication Data
US 2013/0045705 A1   Feb. 21, 2013

Related U.S. Application Data

(60) Provisional application No. 61/367,935, filed on Jul. 27, 2010.

(30) Foreign Application Priority Data

May 31, 2010   (EP) .................................. 10164466

(51) Int. Cl.
*H04B 1/10* (2006.01)

(52) U.S. Cl.
CPC .................................. *H04B 1/1036* (2013.01)
USPC ............................. 455/266; 455/296; 455/307

(58) Field of Classification Search
USPC ............. 455/226.1, 226.2, 226.3, 234.1, 266, 455/278.1, 295, 296, 306, 307; 375/346
See application file for complete search history.

(56) References Cited

U.S. PATENT DOCUMENTS

2004/0224657 A1* 11/2004 Matsusaka .................... 455/296
2007/0140381 A1   6/2007 Suemitsu et al.

FOREIGN PATENT DOCUMENTS

EP        1 956 719 A2   8/2008
WO   2010/046798 A1   4/2010

OTHER PUBLICATIONS

International Preliminary Report on Patentability issued in corresponding International application No. PCT/EP2011/058082 on Dec. 4, 2012.
International Search Report issued in corresponding International application No. PCT/EP2011/058082, date of mailing Aug. 23, 2011.
Written Opinion of the International Searching Authority issued in corresponding International application No. PCT/EP/058082, date of mailing Aug. 23, 2011.

* cited by examiner

*Primary Examiner* — Thanh Le
(74) *Attorney, Agent, or Firm* — Patent Portfolio Builders PLLC (57) ABSTRACT

A wireless receiver for UWB or other format receives a useful signal in a particular band of frequencies in spite of interference components. The wireless receiver has two or more different types of tunable band reject filter, involves detecting interference in the received signal, and selecting which of the different types of filter to use according to thresholds of parameters of the detected interference. The filter is then tuned according to the detected interference and the useful signal is then received with the interference suppressed using the selected BRF. As the different types of filters have different drawbacks and benefits, by having multiple types, and selecting which to use according to the detected interference, the filtering can be better matched to the detected interference, or the drawbacks can be reduced for example.

10 Claims, 10 Drawing Sheets

FILTERING INTERFERENCE DETECTED AT WIRELESS RECEIVER

FIELD OF THE INVENTION

This invention relates to methods of operating a wireless receiver. It also relates to corresponding wireless receivers, and to equipment incorporating such wireless receivers, and to programs for controlling such wireless receivers.

BACKGROUND

It is known that operation of wireless receivers for various frequency bands can be affected by interference components of different types, narrow band or broad band. For example the operation of a wideband system like WiMedia based UWB (Ultra Wide Band) receiver systems can get corrupted by the presence of harmonics from nearby narrowband devices. Due to the wideband nature of UWB system, these harmonics may co-occupy the frequency band with UWB systems. It is proposed that systems like UWB systems estimate these in-band narrowband interferences (NBI) and suppress the spectrum where there is likelihood of these interferences. NBI estimation is done using spectral analysis of the input signal in the digital baseband. This step allows for the estimation of the interferences which are in the frequency band of the UWB devices. It is known from WO2009114123A2 to have a wideband signal processing apparatus for software defined radio that can include a transceiver configured to receive a UWB signal via an antenna. A spectrum analyzer provides a characterization of the UWB signal, which may be used to set a reconfigurable band-reject filter (BRF) to null detected interferers. Changing a gain of the band-reject filter adjusts a centre frequency of the band-reject filter.

It is known from WO2010/018492 to have a UWB receiver having an analog BRF tuned to suppress narrow band interference. Additional digital filtering may be carried out to reduce relative interference strength after analog to digital conversion.

SUMMARY OF THE INVENTION

An object of the invention is to provide improved apparatus or methods. According to a first aspect, the invention provides:

A method of operating a wireless receiver to receive a signal, the wireless receiver comprising tunable band reject filters of at least two different types, the method comprising detecting interference in the received signal, and selecting which of the different types of filter to use according to corresponding different thresholds of one or more parameters of the detected interference. The selected filter or filters is then tuned according to the detected interference and the useful signal is then received with the interference suppressed using the selected BRF.

As the different types of filters have different drawbacks and benefits, by having multiple types, and selecting which to use according to different thresholds of parameters of the detected interference, the filtering can be better matched to the detected interference, or the drawbacks can be reduced for example.

Embodiments of the invention can have any other features added, and some such additional features are set out in dependent claims and described in more detail below.

Another aspect provides: a wireless receiver for receiving a useful signal in a particular band of frequencies in spite of interference, the receiver having two or more different types of tunable band reject filter, and an interference detector for detecting interference in the received signal. There is also circuitry arranged to select which of the different types of filter to use according to different thresholds of the parameters of the detected interference, and circuitry for tuning the selected filter or filters according to the detected interference to filter the interference.

Another aspect of the present invention is a computer program product comprising instructions which when executed by the computer cause the computer to carry out a method of controlling a wireless receiver to receive a signal, the wireless receiver comprising tunable band reject filters of at least two different types, the method comprising the steps of:

determining values of parameters of interference detected in the received signal, selecting which of the different types of filter to use according to different thresholds of one or more parameters of the detected interference, and tuning the selected filter or filters according to the detected interference. The computer program product maybe stored on a non-transitory machine readable signal medium such as a tape drive, a magnetic disk such as a hard drive or a diskette, an optical disk such as a CDROM or a DVD-Rom or a solid state memory such as a USB memory stick.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to interference can encompass any type of interference, narrow band or broadband, continuing or intermittent, or to any part of the interference.

References to receiving are intended to encompass downshifting frequencies to baseband, or distinguishing a band of frequencies, according to the context.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments.

Embodiments to be described can be applied in for example Narrowband interference (NBI) mitigation, OFDM, Wimedia based UWB, Wireless USB, media-access-control (MAC), Cognitive radio, and so on. Hence they can be applied in devices such as mobile phones or mobile computing devices. The output of the detection can be used to tune a BRF such as a notch filter, to cancel the affect of the NBI. The FCC and ITU-R define UWB in terms of a transmission from an antenna for which the emitted signal bandwidth exceeds the lesser of 500 MHz or 20% of the centre frequency. Thus, pulse-based systems—wherein each transmitted pulse instantaneously occupies the UWB bandwidth, or an aggregation of at least 500 MHz worth of narrow band carriers, for example in orthogonal frequency-division multiplexing (OFDM) fashion—can gain access to the UWB spectrum. Unlicensed use of UWB can be in the range of 3.1 to 10.6 GHz. The useful signal information can be modulated on UWB pulses by encoding the polarity of the pulse, the amplitude of the pulse, and/or by using orthogonal pulses. UWB pulses can be sent sporadically at relatively low pulse rates to support time/position modulation, but can also be sent at rates up to the inverse of the UWB pulse bandwidth. UWB systems tend to be short-range and indoors applications. However, due to the short duration of the UWB pulses, it is easier to engineer extremely high data rates, and data rate can be readily traded for range by simply aggregating pulse energy per data bit using either simple integration or by coding techniques. Conventional OFDM (Orthogonal Frequency Division Multiplexing) technology can also be used.

How a wideband system like WiMedia-based UWB can get interference from narrowband devices which operate in its close proximity will now be discussed. These narrowband interferences can co-occupy the frequency spectrum with a UWB system. The effect of such problems on UWB receiver and possible solutions are known and more details can be obtained from Kelleci, B.; Fischer, T. W.; Shi, K.; Yi Zhou; Karsilayan, A. I.; Serpedin, E.; "Narrowband Interference Suppression in Multi-Band OFDM Ultra Wideband Communication Systems: A Mixed-Mode Approach", (Digital Signal Processing Workshop, 12th—Signal Processing Education Workshop, 4$^{th}$, Issue Date: 24-27 Sep. 2006 page(s): 55-59, Teton National Park, Wyo., ISBN: 1-4244-3534-3).

The known solutions adopt a two step approach and involve the suppression of the unwanted interferences by using band reject filters (BRF). A first step deals with interference estimation for tuning of BRFs and a second step involves suppressing the interference using BRFs.

In Band Interference Suppression

To overcome the problems due to in-band narrowband interferences, it is known to suppress the unwanted interferences by using BRFs. This approach uses FFT as a rough spectrometer to analyze the spectrum of incoming signal for interference detection. The input sampling rate of FFT blocks is corresponding to the bandwidth of the system. The ADC uses a higher sampling rate to ease the requirements of analog baseband filtering and is generally followed by a downsampler so that the rest of digital baseband functions at a lower sampling rate. Therefore, the sampling rate at an FFT block is lower than the sampling rate of the ADC. By using this approach, the FFT performs the spectrum analysis on the frequency band corresponding to bandwidth of the UWB signal (528 MHz). Therefore, the current solutions have a search space which covers the in-band interferences. The ADC output is first downsampled before further baseband processing. A power detector is placed just after the ADC, and measures the power of incoming samples. This measurement is used as an input to a gain control part (AGC). This ensures that the analog input signal fits into the maximum signal range supported by the ADC and hence, does not suffer from clipping at ADC.

Such current solutions do not take into account a number of issues.

1. The basic idea in the known schemes is to minimize the dynamic range of signal entering into ADC by using an analog BRF. The band or notch frequency location of this analog BRF filter is tunable but suppression and notch bandwidth are kept fixed to keep limit on filter complexity. For a given signal-to-interference -ratio (SIR), the suppression requirement will be based on the most narrowband interferer, while the bandwidth requirement will be based on the interferer with the largest bandwidth. Fulfilling these two extreme requirements by a single fixed filter results in a higher than necessary filter order. This leads to extra costs in terms of silicon area, effort and power consumption. An analog BRF also causes certain negative side effects such as ringing, group delay, settling time etc. These effects are in proportion to the order of the BRF. Furthermore, UWB system employs band-hopping. This means that system is hopping to different frequency bands at different time instants. A higher order BRF will have a longer settling time. This means that system will take longer to settle while hopping from one band to another. So, it is better to reduce the filter-order of analog BRF if possible.

2. The known schemes involve suppressing the entire interfering signal in the analog domain using a filter with fixed characteristics for different kind of interferers. Whenever an interferer is detected by the digital baseband, the same analog BRF is applied by the system irrespective of the characteristics of the interferer (e.g. interferer strength, bandwidth etc.). So, same power consumption and similar distortion is introduced for different interfering signals. This is not optimal for overall system behaviour.

3. An additional problem occurs if there are multiple interferers of moderate strength in the incoming signal. This means that although SIR is within the design specifications, the interference is spread at different locations in the spectrum, for example, due to the presence of multiple interferers. The known solutions will suppress the strongest interferer and will not do anything for other interferers. Hence, only limited performance gain in such a situation will be achieved.

4. For a low cost-ASIC solution in CMOS processes, system issues can be simplified if analog design is simplified by the assistance of more predictable digital blocks.

Introduction to Some Features of the Embodiments

Some embodiments have different types of digital BRF and some have analog and digital types. A digital BRF scheme can simplify the cost of an analog-BR-only interference suppression solution for example. Notably an adaptive mechanism is proposed to select which of the different types (analog and or digital for example) of BRFs to use, based on the amount of interference from other systems. This can help limit the negative side-effects of a fixed analog-only solution, or a solution in which digital filtering is not selected and controlled independently. Thirdly, in some embodiments, this independent selection can enable tuning to different frequencies to suppress multiple interferers instead of a single interferer only.

Some embodiments can be simplified in terms of area and power consumption if the filtering performance requirements of the analog BRF can be relaxed. An analog BRF also causes certain negative side effects such as ringing, group delay, longer settling time etc. These effects are in proportion to the order of the BRF. So, it can be better to reduce the filter-order of analog BRF as much as possible. Based on these observations, digital assistance for analog BRFs can be adapted to be selected independently, to combat narrowband interference (NBI) more effectively. The digital assistance can be provided by using an additional digital BRF and/or tone-nulling in the frequency domain. This can not only make the system more efficient with respect to the analog BRF, but also provides more flexibility in overall system behavior. Some embodiments involve one or more of:

Digital band reject filtering in the time domain and/or filtering in the frequency domain by means of tone-nulling to assist the interference suppression and/or enable simplifying the analog filter;

adaptively selecting and tuning different counter-measures based on interference characteristics such as bandwidth, power, and centre frequency; and Interference cancellation of multiple interferers since the multiple BRFs can be controlled independently.

Figure 1:
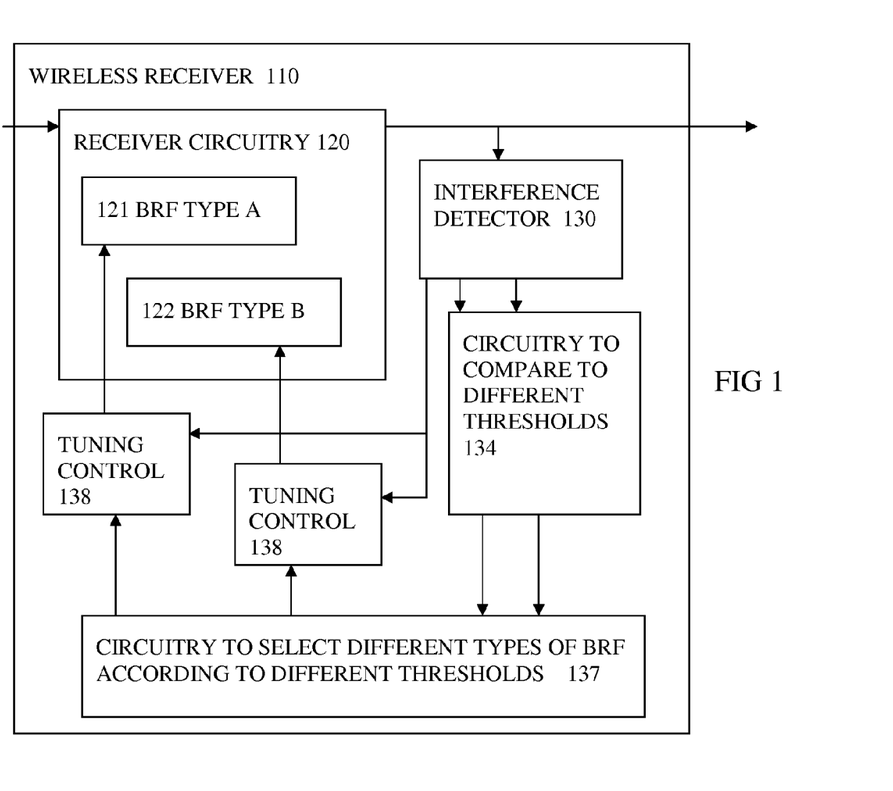
FIG. 1 shows a schematic view of a wireless receiver according to an embodiment.

FIG. 1, Schematic View of a Wireless Receiver According to an Embodiment,

In FIG. 1, a wireless receiver 110 can receive transmissions from a transmitter (not shown). The receiver has receiver circuitry 120, to derive a useful signal in a particular band of frequencies in spite of interference components inside and outside the particular band of frequencies. An interference detector 130 is provided which can detect in band interference at least. The receiver circuitry includes at least two different types of band rejection filter, 121 and 122, shown as types A and B respectively, which can be analog or digital. Circuitry 134 is provided to compare a parameter of the interference to different thresholds to select which of the types of BRF to use. This can operate based on the power and/or other characteristics of the detected interference, or the number of interferers detected at different frequencies for example. Various possible ways to exploit the independent control of the different types of BRF can be envisaged, to provide a better or more efficient match of BRF to the detected interference. Circuitry 137 is also provided to selecte the BRF or BRFs according to the different thresholds to suppress the detected interference, implementable either as separate circuits or integrated together. The selected BRFs can then be tuned to the detected interference by tuning control circuit 138, to tune at least the frequency (as detected by the interference detector) and in some cases the bandwidth or attenuation level.

Some of these parts can be implemented in various ways, and examples will be described in more detail below. There can be many other parts not shown.

Figure 2:
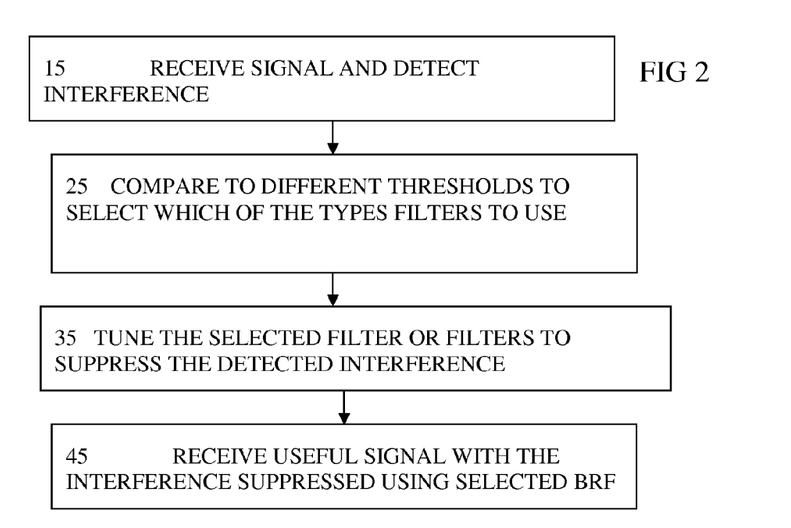
FIG. 2 shows steps in operating a wireless receiver according to an embodiment.

FIG. 2 Steps in Operating a Wireless Receiver According to an Embodiment

In FIG. 2, steps in operating a wireless receiver such as that of FIG. 1, or other embodiments are shown. At step 15, a signal is received, having the useful signal in a particular band. The receiver circuitry operates to receive (meaning distinguish) the particular band, and the interference detector detects the interference. Such detection can be carried out in various ways, as will be described in more detail below. At step 25, a comparison is made to different thresholds to enable the selection between the different types of BRFs, to provide a more appropriate or efficient match of the BRF to the interference. The selection can involve adjusting the proportion of the suppression by the different types, as well as switching only one of them into use, without the other, to optimise the suppression or minimise the drawbacks of the different types. At step 35 the selected BRF or BRFs is or are tuned to suppress the detected interference. This can of course be an iterative process, to achieve the best suppression, by adjusting the amount or frequencies of the suppression and detecting the remaining interference for example. The interference can be distinguished from the useful signal in various ways, depending on how the useful signal is coded or spread over the bandwidth of the channel. At step 45, the useful signal is received by the receiver circuitry with the interference suppressed using the selected BRF or BRFs.

Some Additional Features:

Some additional features which can be added to any of the aspects or embodiments are as follows:

The different types can be analog and digital types. These can have widely differing characteristics such as power consumption, steepness of transition band, added distortion, bandwidth for given cost or complexity and so on.

The selecting step can involve selecting the digital filter without the analog filter, for interference having a strength up to a threshold value. This can enable some drawbacks of analog filters such as power consumption to be reduced, or enables a simpler lower order analog filter to be used, to save costs.

The method can have the step of detecting multiple interferers at different frequencies, and the selecting step can involve selecting different filters for the different interferers.

This can enable better overall interference suppression performance, or simpler circuitry and reduced costs for a given level of performance.

The filter types can comprise a time domain digital filter and the method have the steps of converting the received signal from time domain to frequency domain after the time domain digital filter. Having some time domain filtering can enable early suppression of interference, so that such interference does not become enhanced and harder to suppress by later processing such as the conversion to frequency domain.

A step of controlling a gain of the received signal can be provided before the selection and tuning of the filter, the control of the gain being reassessed after the tuning of the selected filter. This can help enable the gain to be improved if it was affected by the interference before suppression.

A step of attempting to synchronize to the received signal can be provided, and the selecting step be made according to an outcome of the synchronization. This can help indicate how much effect the interference is having and enable the filtering to be better matched to the interference.

One of the filter types can be more readily tunable to suppress out of band interference, and the detecting step comprise the step of detecting out of band interference, the selecting step involving selecting the more readily tunable filter type, and the tuning step involve tuning that filter to suppress the detected out of band interference. This can help enable better matching of filter type to the actual interference detected, or help reduce the cost or complexity of making other filter types sufficiently flexible to address the out of band interference.

The receiving can involve receiving transmissions using a band hopping protocol. The useful signal can be a UWB signal.

Examples of these additional features are shown in the embodiments described below.

Figure 3:
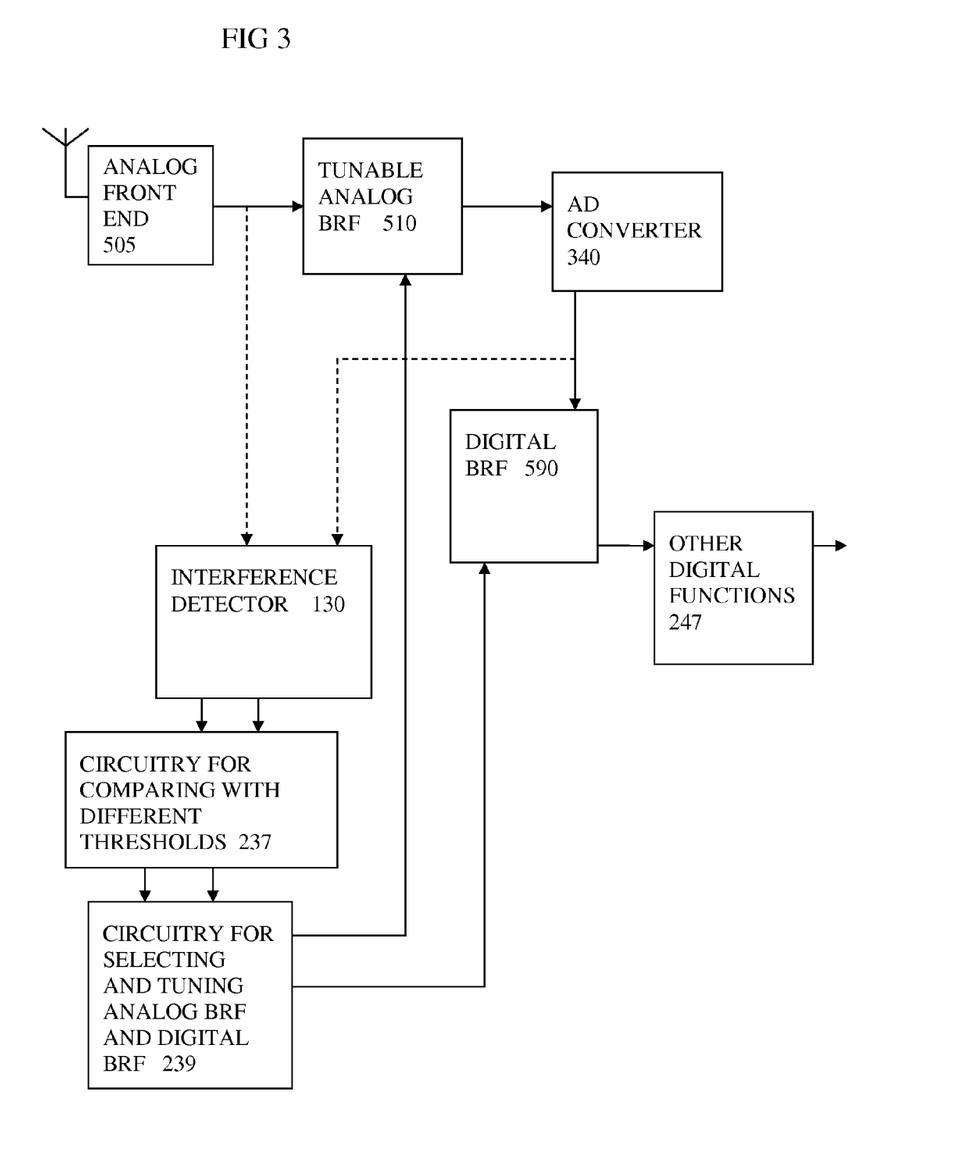
FIG. 3 shows a schematic view of a wireless receiver according to an embodiment, and having analog and digital BRFs.

FIG. 3, Wireless Receiver Having Analog and Digital BRFs

FIG. 3 shows parts of a receiver according to an embodiment having type A in the form of an analog tunable BRF 505 and type B in the form of a digital tunable BRF 590. This can be either a time domain filter or a frequency domain filter for example. The receiver circuitry has an analog front end 505 which feeds the tunable analog BRF. An AD converter 340 converts the filtered analog signal into a digital signal. This is fed to the digital BRF 590, and the filtered output of the digital BRF is fed to other digital functions 247. The interference detector is shown with inputs from the analog or digital signal, to show that in principle it can be coupled at various locations and implemented in analog or digital form, though a digital form is almost always more practical. The tunable analog and digital BRFs are controlled by circuitry 237 for comparing the interference with different thresholds, and circuitry 239 for selecting and tuning, based on the different thresholds, as discussed above. Other parts not shown can be added in between or after the parts shown.

Figure 4:
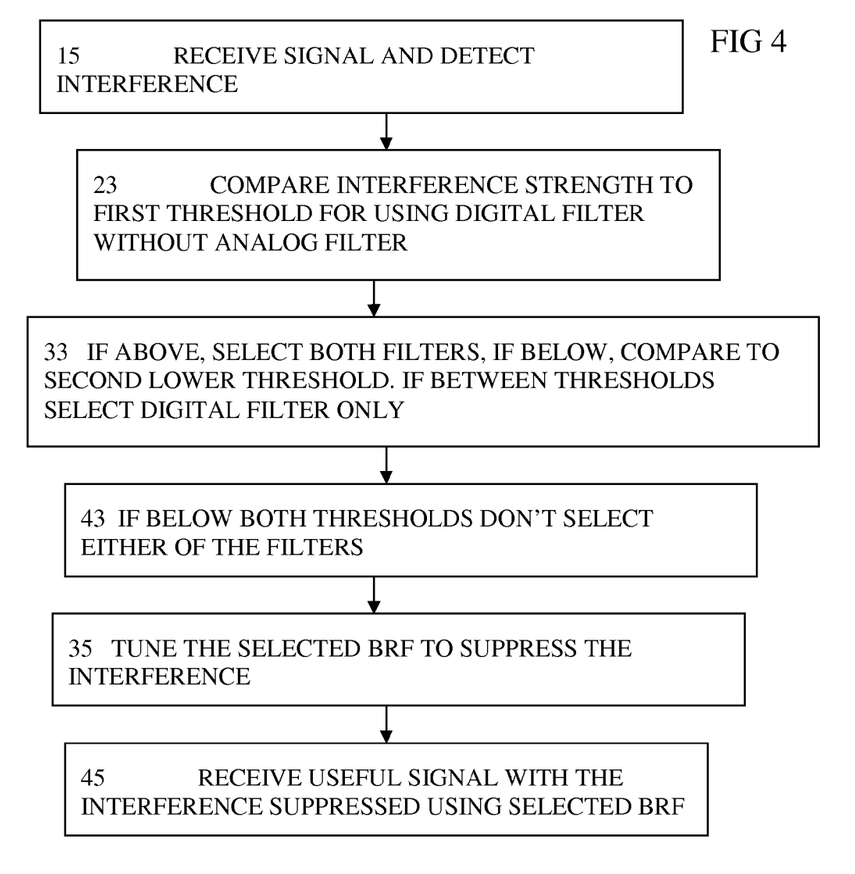
FIG. 4 shows steps in operating a wireless receiver according to an embodiment, showing selecting a digital BRF without an analog BRF.

FIG. 4, Steps in Selecting a Digital BRF without an Analog BRF

There are various ways of operating the embodiment of FIG. 3 to benefit from the separate selection of the types of BRF. One way is shown in FIG. 4. The signal is received at step 15 and the interference is detected, without filtering initially. At step 23 the strength of the interference is compared to a first threshold for using the digital filter only without the analog filter. Step 33 involves selecting both filters if the interference is above that first threshold. If below, a second lower threshold is used, and the digital filter only is selected if the interference is between thresholds according to the result of that comparison to provide a more appropriate or efficient match of the BRF to the interference. The selection can involve adjusting the proportion of the suppression by the different types, as well as switching only one of them into use, without the other, to optimise the suppression or minimise the drawbacks of the different types. There may be a lower threshold which if exceeded starts the digital filtering only, and a higher threshold, which if exceeded starts the analog filter operating. If the interference is below the lower threshold, at step 43, neither of the BRFs is selected. At step 35 the selected BRF or BRFs is or are tuned to suppress the detected interference. At step 45, the useful signal is received by the receiver circuitry with the interference suppressed using the selected BRF or BRFs.

Figure 5:
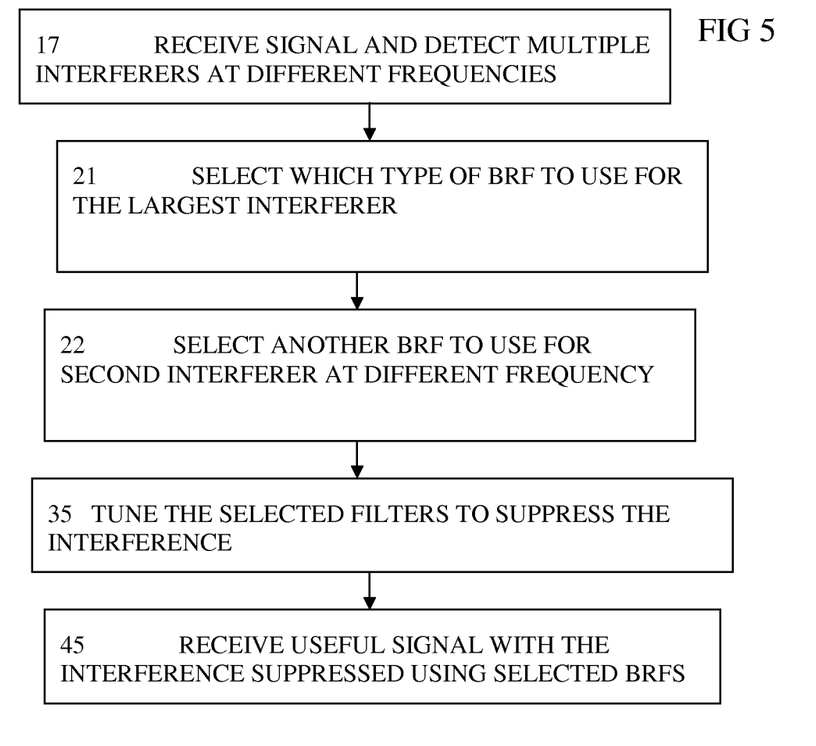
FIG. 5 shows steps in operating a wireless receiver according to an embodiment involving detecting multiple interferers.

FIG. 5 Steps in Operating a Wireless Receiver Involving Suppressing Multiple Interferers, FIG. 5 shows steps for another embodiment, which could be carried out by the receiver of FIG. 1 or 3 or other embodiment. At step 17, the signal is received and multiple interferers are detected at different frequencies. This can involve detecting the strongest interferer and then determining if there are other major interferers, by using other thresholds. If so then it may be more effective to use the different types of BRFs for different interferers. At step 21 a selection is made of which BRF to use for the largest interferer. This can be for example the analog BRF, if the interferer is strong enough. At step 22 another BRF is selected to use for suppressing the second largest interferer at a different frequency. At step 35 the selected BRFs are tuned to suppress the detected interference. At step 45, the useful signal is received by the receiver circuitry with the interference suppressed using the selected BRFs.

Figure 6:
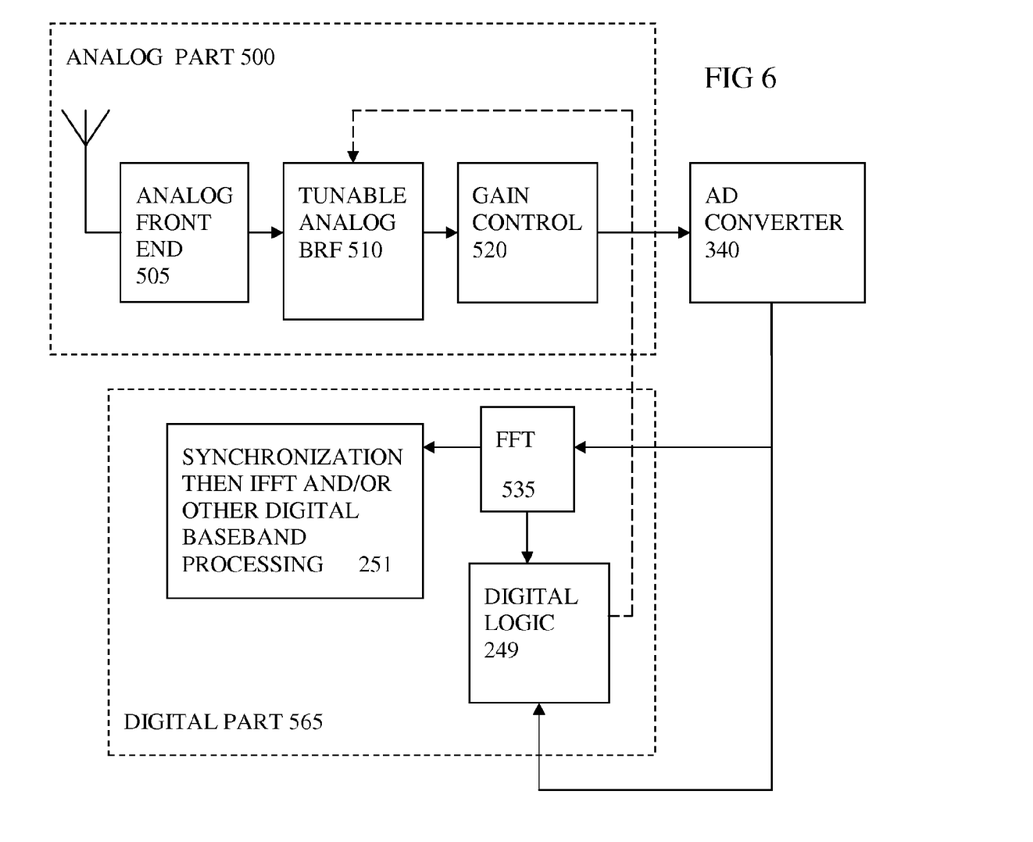
FIG. 6 shows a schematic view of a wireless receiver according to an embodiment, and having analog and digital parts.

FIG. 6 Schematic View of a Wireless Receiver According to an Embodiment Having Analog BRF and Gain Control, and Digital FFT and Logic In FIG. 6, a schematic view of an example of a receiver shows an analog part 500 and a digital part 565. In the analog part is an antenna feeding an analog front end 505. This can include a mixer and LO, adaptable to receive a different range of frequencies. The front end feeds a tunable BRF 510. This feeds a gain control part 520. The output of this is fed to the ADC 340. The BRF optionally has a bypass path so that it is switched out during detection of the interference. The ADC feeds digital signals to the digital part 565. This can include digital logic 249 for carrying out various processing functions including power detection to provide a measure of maximum power to feed back a control signal to the gain control part. The digital part can also include a FFT part 535. This FFT part forms a spectral analyzer for use in the interference detector 130. Other logic is used to process the resulting spectrum to detect the interference. Further logic 249 can be used to carry out the BRF selection and tuning control to feedback to the tunable analog BRF. The FFT can feed subsequent digital baseband parts, shown by a block 251 for synchronisation, IFFT and or other processing as needed for the application. If appropriate, the FFT can be bypassed so the digital baseband has access to the time domain information, for deriving the useful signal.

Figure 7:
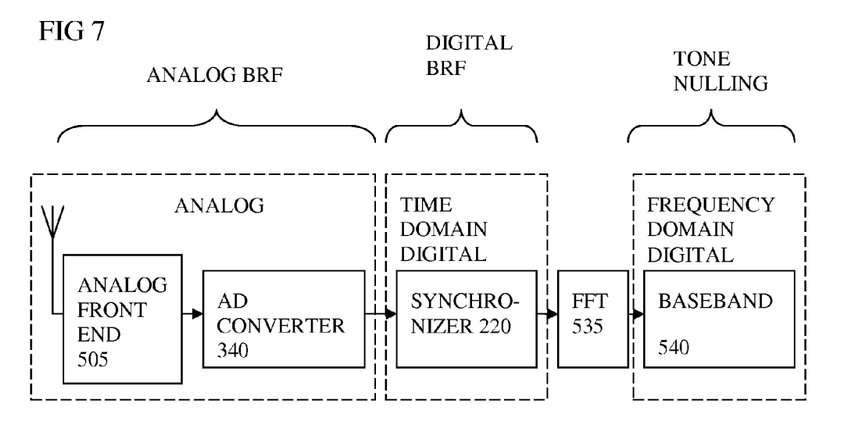
FIG. 7 shows a schematic view of a wireless receiver according to an embodiment having a synchronizer and multiple BRFs.

FIG. 7 Schematic View of a Wireless Receiver Having a Synchronizer and Multiple BRFs FIG. 7 shows another embodiment of a wireless receiver having three different types of BRF; an analog BRF, a digital time domain BRF and a digital frequency domain BRF (tone nulling). The locations of these parts in the receiver chain are shown in FIG. 7. The analog BRF can be in the analog dotted line box, where the chain has the analog front end 505 and the ADC 340. The digital time domain BRF can be in the time domain digital part, where there can be a synchronizer 220 in a typical receiver. After the FFT 535 is the frequency domain part, which also has the baseband part 540. The frequency domain BRF in the form of a tone nulling circuit can be in this part of the chain.

The analog filter requirements can be simplified by providing additional interference suppression mechanisms in the digital part of the system. The working can be understood from the following analysis of the problem. It is also feasible to have embodiments with no analog BRF, relying on the different types of digital BRF.

1. Presence of interference will cause an increase in the dynamic range of input signal while ADC precision (~6 bits) remains fixed. For very strong interferers, the dynamic range of input signal will be increased enormously. Therefore, the weaker part (the desired UWB signal) of the input signal will be submerged in the quantization noise after the AD conversion. In such a case, the performance of the overall system can be improved by improving the dynamic range of signal going into the ADC. This can be done by using an analog BRF to suppress the NBI. The suppression should be sufficient to protect the system from the quantization effect of the ADC but may or may not be preventive for the rest of the digital baseband processing. So, residual interference will still go to the digital baseband and can be handled there.

2. Lower level or residual interference can be handled in the digital domain by taking preventive actions at different points in the digital baseband.

a. Incoming data from the ADC is processed in the time-domain part (mainly synchronization) of the digital baseband first. So, if the interference affects the synchronization part (Time-domain part), then corresponding preventive action can be taken by a digital BRF.

b. If interference is so weak that the synchronization of system still works, then only the frequency domain part of digital baseband will get affected. This can be solved by tone-nulling.

So, different parts of receiver chain, shown by the dotted line boxes in FIG. 7, have different levels of tolerance to interference. An additional point to note here is that the cost of taking preventive actions is different at different points of the receiving chain. For example, analog filtering has a number of side-effects like signal distortion, power consumption, process/temperature variability etc. The higher the filter order, the higher these effects will be. So, it is better to use the analog filtering only for strong interferers where the performance of the overall system can be improved by improving the dynamic range of signal going into the ADC. For the weaker interferers or the residual interference from stronger interferers, remedial actions are employed in digital baseband at the most optimal places. So, the remedial actions can be based on interferer strength at different points of receiving chain to make the overall realization more optimal.

In this way, the overall analog filtering requirements are eased and design is simplified. It also allows more flexibility in overall performance with respect to interferers' characteristics and simultaneous handling of multiple interferers.

An additional advantage is that the system can react to multiple interferers of moderate strength simultaneously by activating different parts of the interference suppression for different interferers. If there are multiple interferers present, corresponding tones are rejected in the frequency domain. If needed, analog and digital BRFs may also be activated at the same or different locations according to the interference scenario.

Figure 8:
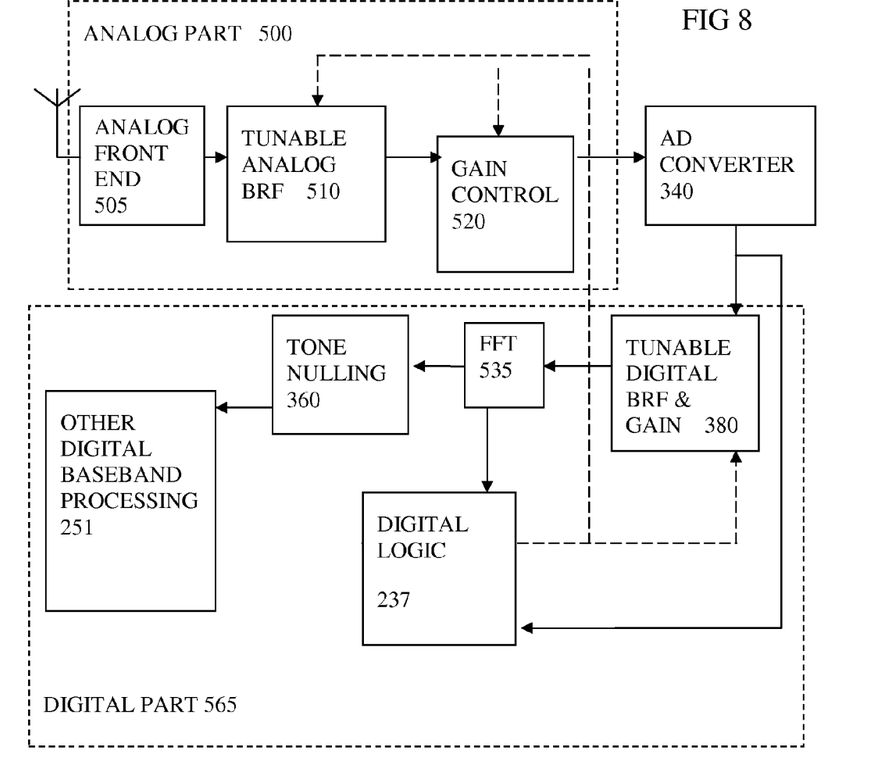
FIG. 8 shows a schematic view of receiver circuitry according to an embodiment having tone nulling.

FIG. 8 Schematic View of Receiver Circuitry Having Tone Nulling

FIG. 8 shows another embodiment of a receiver, similar to that of FIG. 6 and also having additional parts in the digital side. A tunable digital BRF and gain section 380 receive the digital samples from the ADC. After the FFT is a tone nulling section 360 followed by other digital baseband processing, 251. The digital logic section 237 can provide power detection and control of digital or analog gain control parts as well as providing the selection and tuning of the different types of BRFs.

Figure 9:
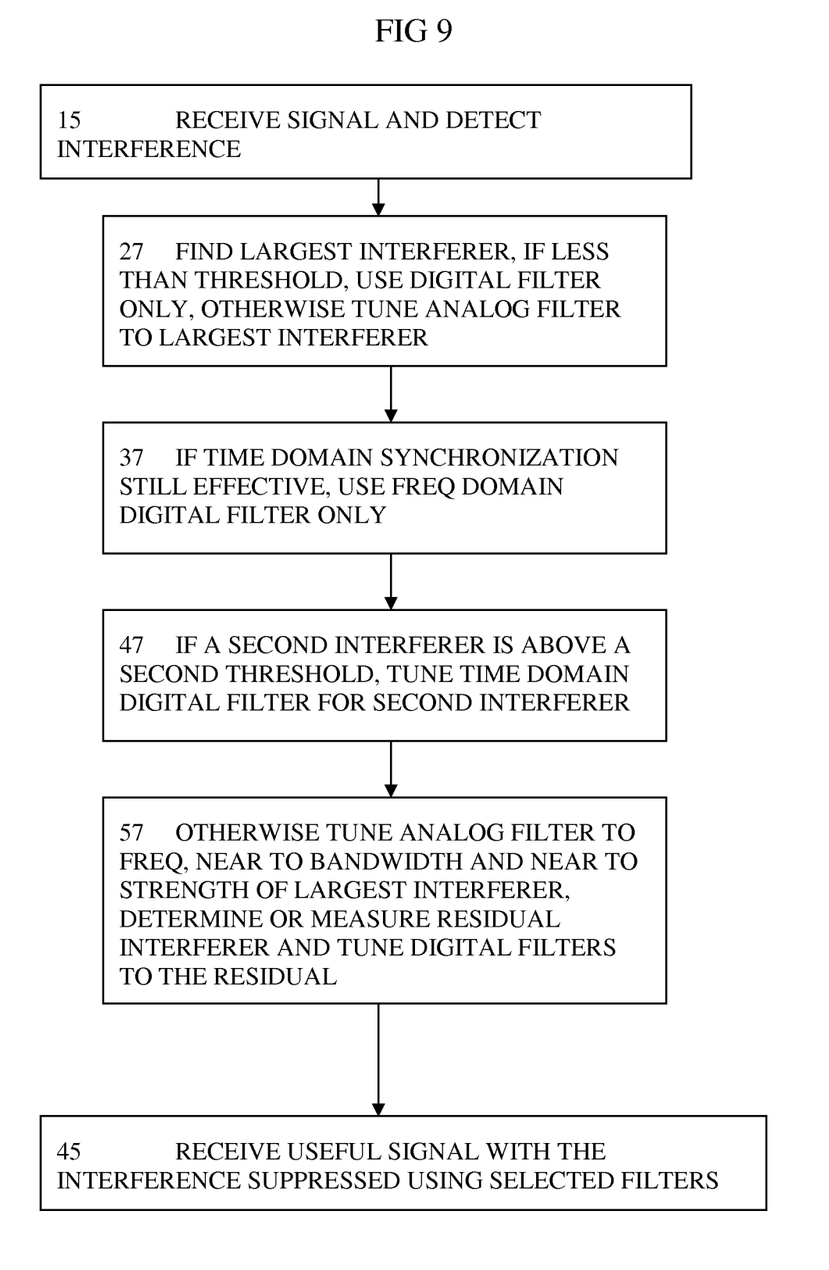
FIG. 9 shows steps in operating a wireless receiver according to an embodiment, showing having multiple interferers.

FIG. 9 Shows Steps in Operating a Wireless Receiver According to an Embodiment, Showing Having Multiple Interferers The steps of the embodiment of FIG. 9 can represent the operations of the embodiment of FIGS. 1,3, 6, 7, 8 or other embodiment. At step 15, a signal is received, having the useful signal in a particular band. The receiver circuitry operates to receive (meaning distinguish) the particular band, and the interference detector detects the interference. Such detection can be carried out in various ways, one of which will be described in more detail below. Steps 27, 37, 47 and 57 correspond to steps 25 and 35 of FIG. 2, in which a selection is made between the different types of BRFs, according to the interference detection, to provide a more appropriate or efficient match of the BRF to the interference. This can involve the following steps. At step 27, the largest interferer is found. If less than a threshold, a digital filter only is used, otherwise the analog filter is tuned to the largest interferer. At step 37 if time domain synchronisation is working, then only the frequency domain digital filter is used. At step 47, if a second interferer is above a second threshold, the time domain digital filter is tuned for the second interferer. At step 57, otherwise, the analog filter is tuned to the frequency and optionally to the bandwidth and strength of the detected interference. The residual interference can be measured or estimated and the digital filter or filters can be tuned to the residual interference or to some other interferer. At step 45, the useful signal is received with interference suppressed using the selected filters.

Figure 10:
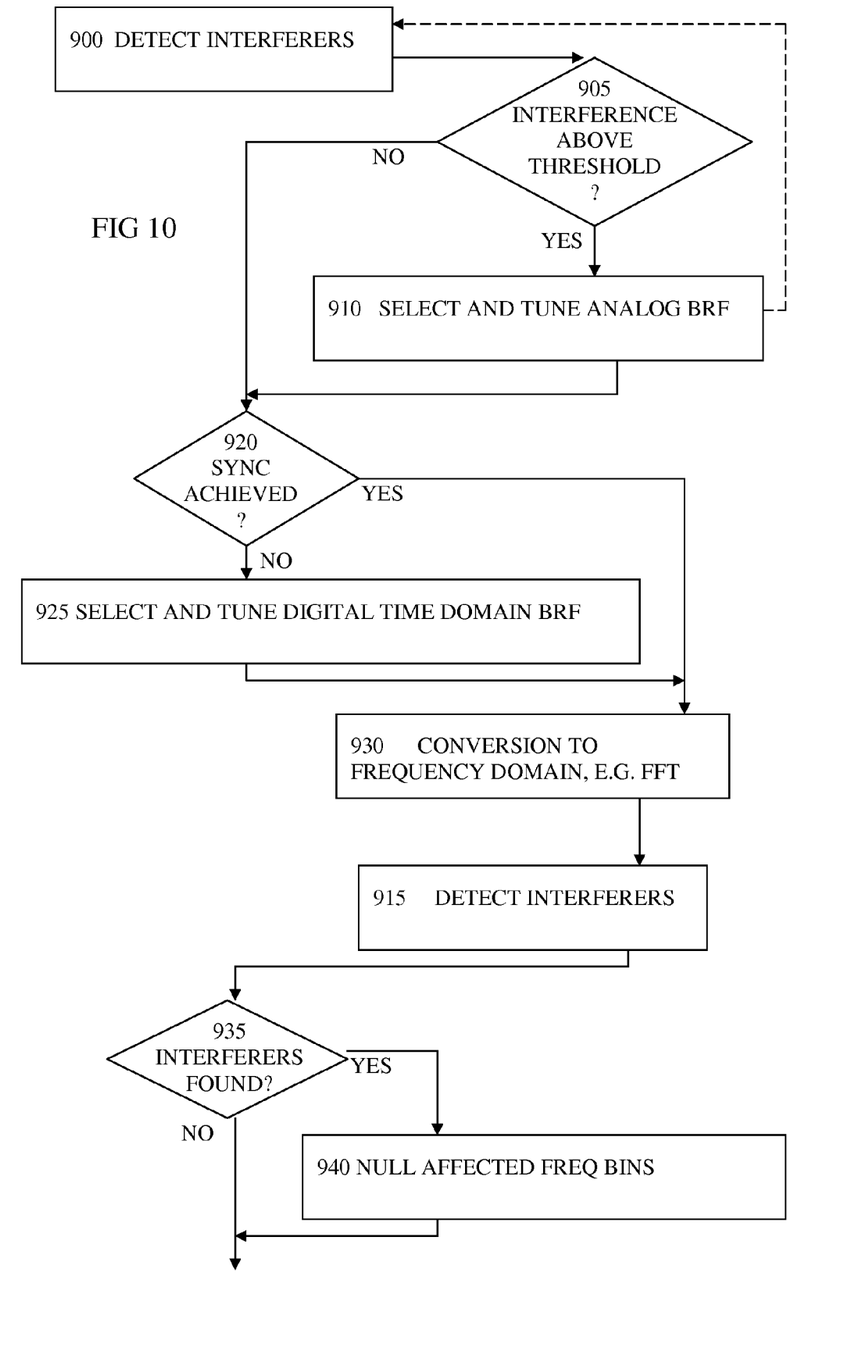
FIG. 10 shows steps in operating a wireless receiver according to an embodiment, showing selecting BRFs depending on interference detection, and synchronization, and detecting residual interference after a time domain digital BRF, in order.

FIG. 10, Steps in Operating a Wireless Receiver According to Another Embodiment In the embodiment of FIG. 10, steps are shown for use in the receiver of FIGS. 1, 3, 6, 7, 8 or other embodiment, this time involving three types of BRF, an analog BRF, a digital time domain BRF, and a digital frequency domain BRF. At step 900, interferers are detected. At step 905 whether the interference is above a first threshold is determined. If so, the analog BRF is selected and tuned. Otherwise at step 920, whether synchronisation is achieved is checked. If not, then at step 925, the digital time domain BRF is selected and tuned. Otherwise this is bypassed and at step 930, the conversion to frequency domain is carried out. At step 915, optionally interferers are detected again and if found at step 935, then the frequency domain filtering is selected and tuned so that the appropriate frequency bins are nulled.

Figure 11:
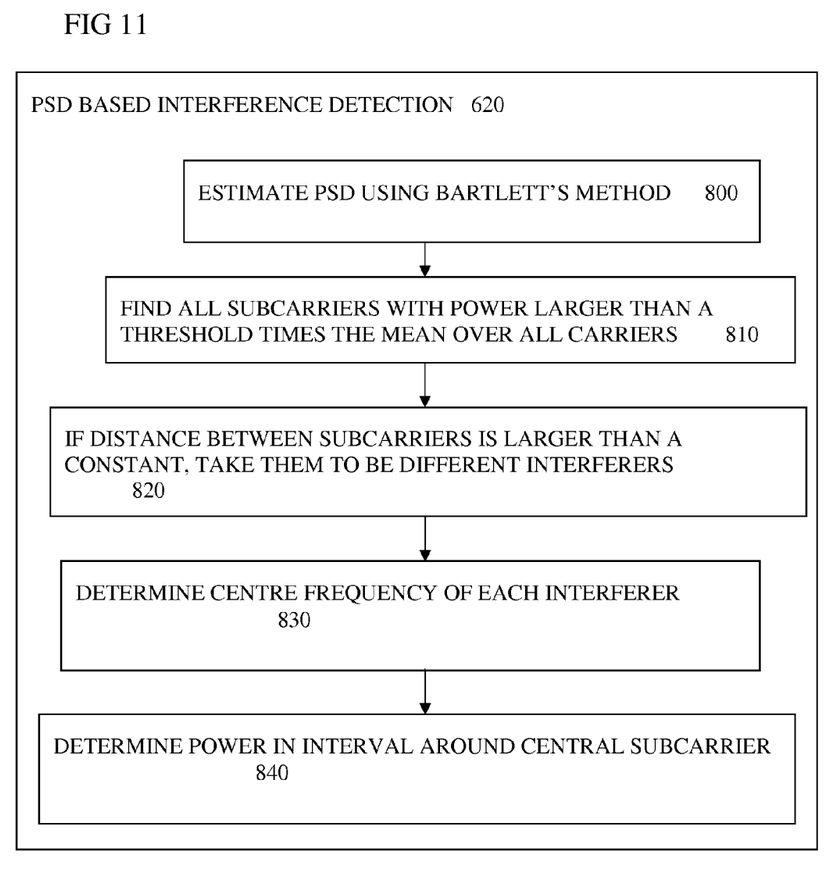
FIG. 11 shows steps involved in interference detection.

FIG. 11, Steps in Interference Detection

In FIG. 11, steps involved in an example of the interference detection are shown. Other examples could be envisaged. At step 800, the PSD is estimated from the FFT output using Bartlett's method. At step 810 all the subcarriers with a power larger than a threshold times the mean over all carriers are found. At step 820, if the distance in frequency between subcarriers over this power is larger than a constant, they are taken to be separate interferers. At step 830, a centre frequency of each interferer is determined. Then a power in the interval around the central subcarrier is determined at step 840.

Other Matters

Some of the method steps discussed above for determining parameters, or comparing parameters to thresholds, or selecting and tuning filters for example, may be implemented by logic in the form of hardware or, for example, in software using a processing engine such as a microprocessor or a programmable logic device (PLD's) such as a PLA (programmable logic array), PAL (programmable array logic), FPGA (field programmable gate array).

An example of a circuit with an embedded processor will be described for use mobile radio telephone receiver/transceiver. This circuit may be constructed as a VLSI chip around an embedded microprocessor such as an ARM7TDMI core designed by ARM Ltd., UK which may be synthesized onto a single chip with the other components shown. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for receiving and transmitting data to the relevant networks, e.g. a data or speech information, wireless or cable networks. FIFO buffers may be used to decouple the processor from data transfer through these interfaces. The interface can provide network connections, i.e. suitable ports and network addresses, e.g. the interfaces may be in the form of network cards. One interface can provide a wireless front end for receiving wireless transmissions from a wireless network.

Software programs may be stored in an internal ROM (read only memory) and/or on any other non-volatile memory, e.g. they may be stored on an internal non-volatile memory such as a hard disc or solid state memory or in an external memory. Access to an external memory may be provided an external bus interface if needed, with address, data and control busses. The methods and/or receiver of the present invention may be implemented as software to run on a processor. In particular a receiver in accordance with the present invention may be implemented by suitable programming of the processor. The methods and procedures described above may be written as computer programs in a suitable computer language such as C and then compiled for the specific processor in the embedded design. For example, for the embedded ARM core VLSI described above the software may be written in C and then compiled using the ARM C compiler and the ARM assembler. The software has code, which when executed on a processing engine provides the methods and/or the wireless receiver of the present invention. The software programs may be stored on any suitable machine readable medium such as magnetic disks, diskettes, solid state memory, tape memory, optical disks such as CD-ROM or DVD-ROM, etc.

Other variations can be envisaged within the scope of the claims.

The invention claimed is:

1. A method of operating a wireless receiver to receive a signal, the wireless receiver having at least a digital type tunable band reject filter and an analog type tunable band reject filter, the method having the steps of:
    detecting interference in the received signal,
    selecting which of the different types of filter to use according to different thresholds of one or more parameters of the detected interference wherein the digital type of band reject filter is selected without the analog type of band reject filter for interference having a first threshold value for a first of the parameters,
    tuning the selected filter or filters according to the detected interference, and filtering the interference using the selected filter or filters.

2. The method of claim 1, comprising the step of detecting multiple interferers at different frequencies, and the selecting step involving selecting different filters for the different interferers.

3. The method of claim 1, the filter types comprising a time domain digital type of filter.

4. The method of claim 1, comprising the step of converting the received signal from time domain to frequency domain, and the band reject filter types comprising a frequency domain digital filter.

5. The method of claim 1, comprising the step of controlling a gain of the received signal before the selection and tuning of the filter, the control of the gain being reassessed after the tuning of the selected filter.

6. The method of claim 1, comprising the step of attempting to synchronize to the received signal, and the selecting step being made according to an outcome of the synchronization.

7. The method of claim 1, comprising receiving transmissions using a band hopping protocol.

8. A wireless receiver for receiving a useful signal in a particular band of frequencies, the receiver comprising:
- at least a digital type tunable band reject filter and an analog type tunable band reject filter,
- an interference detector for detecting interference in the received signal, threshold circuitry arranged to compare one or more parameters of the interference to different thresholds to select which of the different types of filter to use, the circuitry being arranged to select the digital type of band reject filter without the analog type of filter for interference having a first threshold value for a first of the parameters, and
- circuitry for tuning the selected filter or filters according to the detected interference to filter the interference.

9. The receiver of claim 8, the interference detector being arranged to detect multiple interferers at different frequencies, and the selecting circuitry being arranged to select different filters for the different interferers.

10. A non-transitory computer readable medium comprising instructions which when executed by the computer cause the computer to carry out a method of controlling a wireless receiver to receive a signal, the wireless receiver having at least a digital type tunable band reject filter and an analog type tunable band reject filter, the method comprising the steps of:
- determining values of parameters of interference detected in the received signal,
- selecting which of the different types of filter to use according to different thresholds of one or more parameters of the detected interference wherein the digital type of band reject filter is selected without the analog type of band reject filter for interference having a first threshold value for a first of the parameters, and
- tuning the selected filter or filters according to the detected interference.

* * * * *